June 6, 1944. R. W. BAILEY 2,350,486
FEEDING DEVICE
Filed March 27, 1942 2 Sheets-Sheet 1
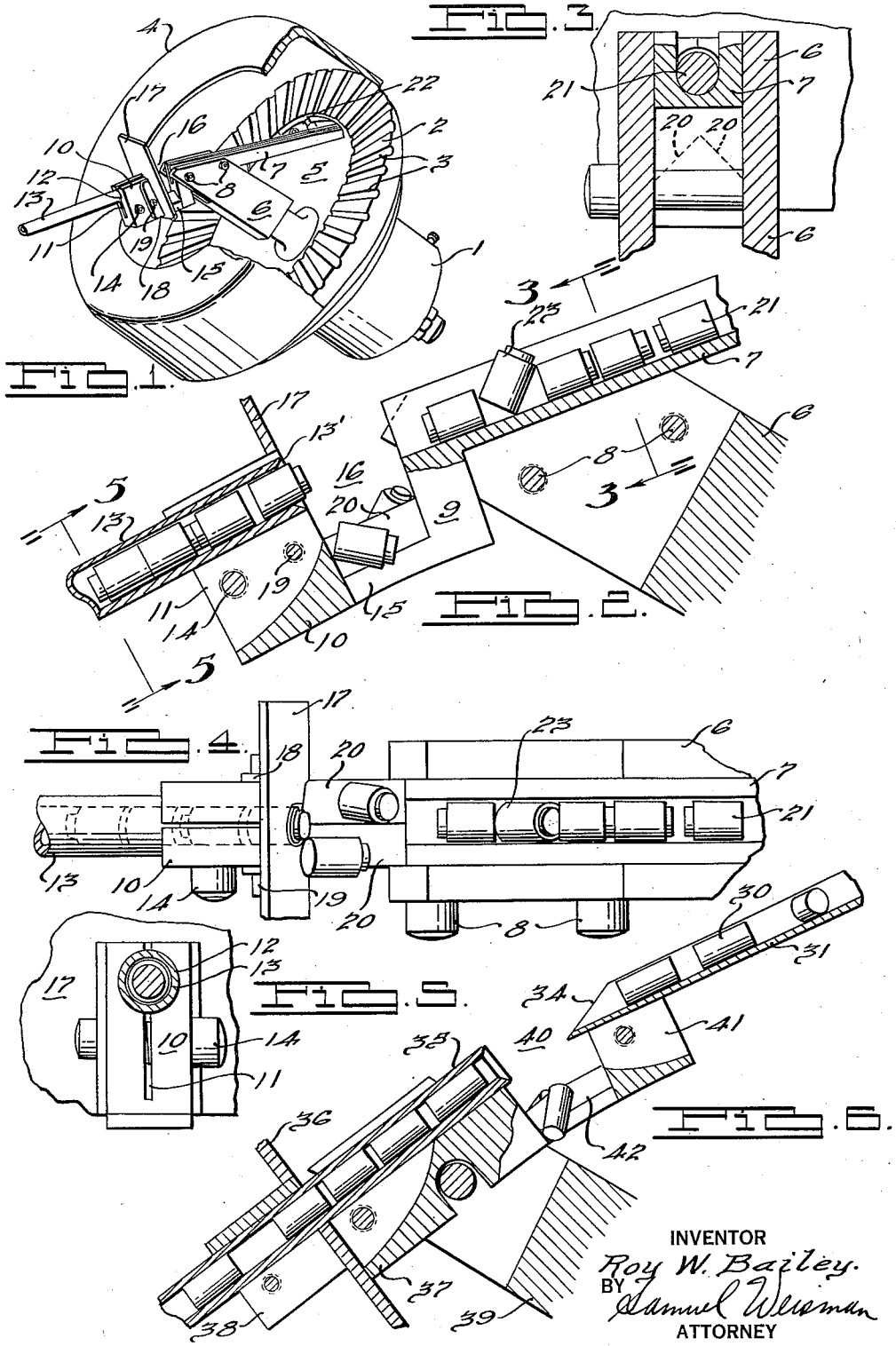

June 6, 1944. R. W. BAILEY 2,350,486
FEEDING DEVICE
Filed March 27, 1942 2 Sheets-Sheet 2
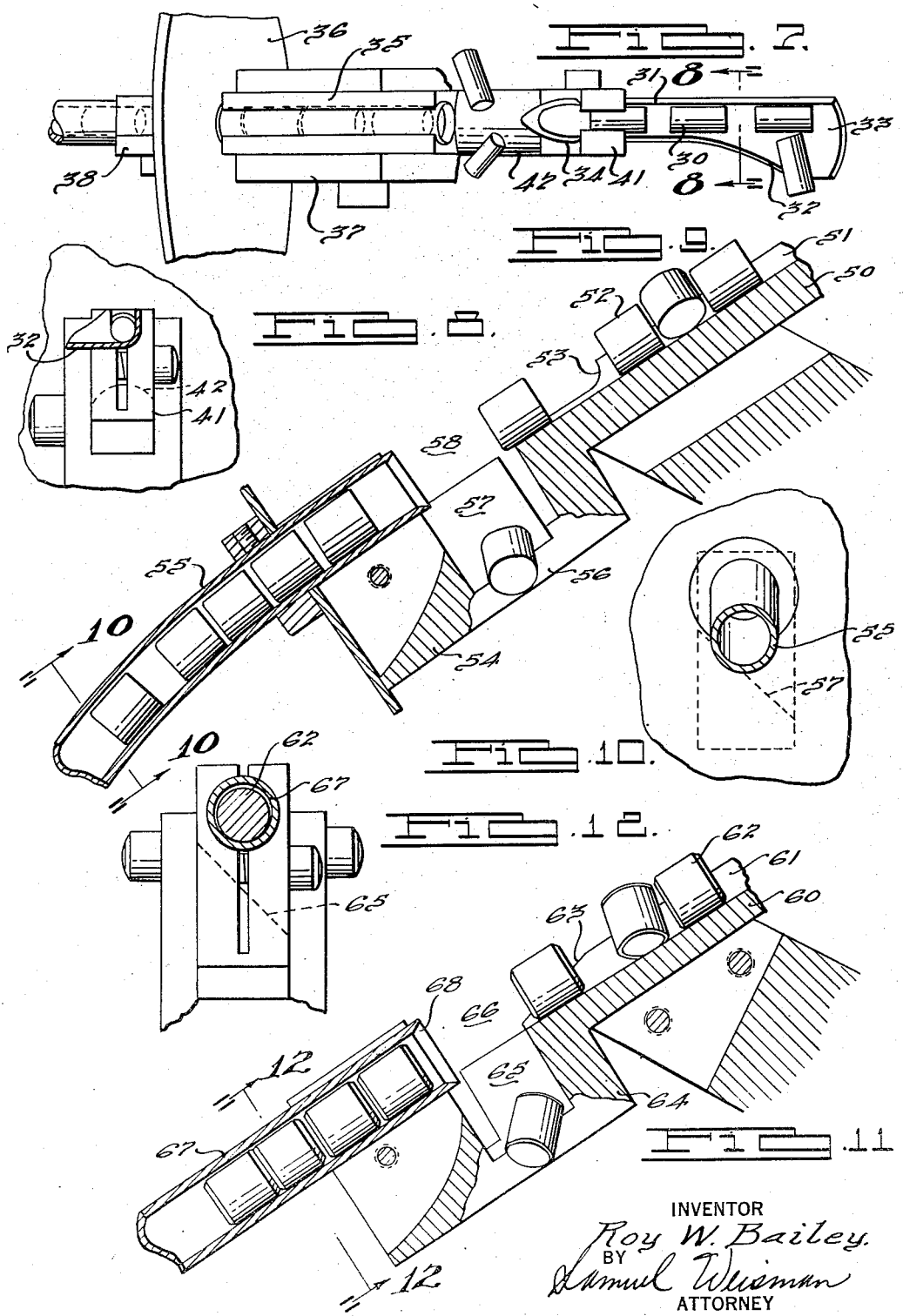
INVENTOR
*Roy W. Bailey.*
BY
*Samuel Weisman*
ATTORNEY Patented June 6, 1944

2,350,486

UNITED STATES PATENT OFFICE 2,350,486

FEEDING DEVICE

Roy W. Bailey, Detroit, Mich., assignor to Detroit Power Screwdriver Company, Detroit, Mich.

Application March 27, 1942, Serial No. 436,453

3 Claims. (Cl. 10—165)

The present invention pertains to a novel mechanism for delivering articles of various shapes to a machine in which the articles are to be further processed. Generally speaking, the articles are picked out of an irregular mass by means of a rotating collector ring and selectively deposited on a chute which conveys them to the processing machine in proper alinement to be handled thereby. Devices of this general character are known in the nail handling art and are also disclosed in the Dellaree patents identified below.

One of the difficulties in the feeding operation is the alining of the articles in the chute for presentation to the processing machine in the proper position. Another problem is to avoid accumulation of articles in the chute, resulting from feeding at a faster rate than the machine can handle them and resulting in choking or jamming between the rotating collector ring and the stationary chute, whereby the machine may become damaged.

The present invention provides a simple expedient for overcoming both of these difficulties. Briefly, the chute leading to the processing machine is made in two parts, one a receiving chute portion immediately adjacent to the collector ring, and the other a delivery chute portion extending to the processing machine. These portions are separated by a gap of such size as to permit certain articles to fall entirely out of the feeding path. Those articles that are properly alined on the receiving chute will jump the gap and enter the delivery chute. The others will strike the end of the delivery chute and fall in the gap.

The gap also prevents excessive accumulation of articles. The accumulation can extend only as far upward as the gap. Thereafter, additional articles strike against the end of the delivery chute or against the last accumulated articles and fall in the gap.

Other details of the construction must be accommodated to the particular article being handled, as will appear as the description proceeds.

The invention is fully disclosed by way of example in the following description and in the accompanying drawings in which Figure 1 is a perspective view, partly broken away, of the hopper and chute;

Figure 2 is a longitudinal section of the chute;

Figure 3 is a section on the line 3—3 of Figure 2;

Figure 4 is a plan view of the chute;

Figure 5 is a section on the line 5—5 of Figure 2;

Figure 6 is a longitudinal section of a modified construction;

Figure 7 is a plan view thereof;

Figure 8 is a section on the line 8—8 of Figure 7;

Figure 9 is a longitudinal section of another modification;

Figure 10 is a section on the line 10—10 of Figure 9;

Figure 11 is a longitudinal section of another construction;

Figure 12 is a section on the line 12—12 of Figure 11.

Reference to these views will now be made by use of like characters which are employed to designate corresponding parts throughout.

In Figure 1 is illustrated the general assembly of the hopper which is supported in a suitable manner or as shown in the patents to Frank H. Dellaree, No. 2,025,273 of December 24, 1935 and No. 2,060,182 of November 10, 1936. While the hopper shown in said patents is designed for feeding screws, the construction described herein may be utilized for feeding various articles as will appear in the detailed specification.

The assembly includes a gear housing 1 from which is driven a collector ring 2 formed with slots 3 extending from one circumference to the other. To the outer circumference of the ring is secured a flanged receptacle 4 in which are contained the articles to be fed. Within the ring 2 is a fixed plate 5 from which is supported the chute leading to the processing machine, as will presently be described. The housing 1, ring 2, receptacle 4 and plate 5 are preferably on an axis at an angle to the horizontal, so that the articles are better contained in the bottom of the receptacle and fed by gravity to the ring 2.

The fixed plate 5 is utilized to support a channeled block or fork 6 lying substantially in the axis, and this in turn supports a receiving chute member 7 sloping downwardly from the highest point of the inner circumference of the collector ring 2. Although the chute in this case is a channel, it may have other forms as will presently be shown, and the word "chute" is to be understood throughout the specification and claims as denoting a member along which the articles are adapted to slide, rather than merely a channeled member. As shown, the lower end of the chute is held in the slot of the member 6 by screws 8.

Beyond the lower end of the receiving chute portion 7 is a delivery chute portion, with sufficient space between these parts of sufficient size to permit the articles to fall entirely out of the chute under certain conditions. For this purpose, a substantially U-shaped support 9 has one of its sides formed integral with or secured to the lower end of the chute 7 and its other side adapted to support the delivery chute member. The last named side 10 is split at 11 and also formed with a larger cavity 12 in line with the chute 7 and adapted to receive the delivery chute member 13 which may be secured by a screw 14 mounted in the side 10 and across the split 11. The member 13, in this case a tube, delivers the articles into the processing machine and for this reason is designated as the delivery chute member or portion.

The bridge 15 of the U-shaped member, disposed beneath the gap 16 of said member, preferably lies directly over the lowest portion of the receptacle 4, so that articles falling from the gap 16 will drop among the articles in the receptacle. To prevent any articles from falling outside of the receptacle, a shield 17 is secured to the side 10 by means of flanges 18 and screws 19. The bridge 15 is double-bevelled at 20 so that the articles may fall to either side.

As one example of the articles to be handled, there are shown a number of uniform or identical cylindrical members 21 in Figures 2 to 5. These are initially thrown in mass into the receptacle 4 and are picked up and raised by the ring 2 in substantially the manner described in the aforementioned Dellaree patents. Before being delivered from the top of the ring to the receiving chute 7, they are selected by certain accessories 22 near the top of the fixed plate 5, so that any articles not lying properly in the slots 3 will merely be carried beyond the upper end of the chute 7 and returned to the receptacle. These accessories are fully disclosed in the aforementioned Dellaree patents.

Those articles that lie properly or axially in the chute 7 jump the gap 6 and enter the delivery chute member 13 by which they travel to the processing machine. The receiving end of the member 13 is slightly flared at 13' to facilitate receiving the articles. Also, the U-shaped member is bent or otherwise modified to place the delivery chute 13 at a slight angle to the receiving chute 7, as illustrated in Figure 2, to compensate for the slight deflection in the path of the articles as they jump the gap.

The articles that do not lie axially in the chute 7, one of which is designated by the numeral 23, fail to enter the delivery chute 13 and merely drop in the gap 16 which, as previously indicated, is of such dimensions as to permit the articles to fall freely.

In addition to being a selector, the gap 16 is also an overflow for excess pieces. The rate at which the processing machine can receive the articles is obviously limited, but the articles may enter the delivery chute at a greater rate. Such accumulation would ordinarily reach the upper end of the receiving chute 7 and might lock or bind the ring 2, with damage to the feeding mechanism. With the provision of the gap 16, the accumulation extends only to the upper end of the delivery chute 13, and the article in said end causes the succeeding articles to fall in the gap as illustrated in Figure 2. The use of a complicated escapement mechanism, which is not altogether satisfactory, is avoided.

In Figures 6 to 8 is shown a modified construction designed to handle articles that are likely to be discharged from the ring 2 in an unalined condition. These may, for example, be elongated cylindrical bodies 30 of uniform diameter. In order that they may not become locked between the ring and the upper end of the receiving chute 31, they are permitted to enter the chute by means of a lateral lip 32 forming a widened mouth 33 at said end. They roll a short distance along the lip and then fall into the hopper as they cannot enter the uniform portion of the chute. For this type of article, it has been found advantageous to bevel the lower end of the member 31 at 34 and to mount the receiving chute portion 35 at a greater angle to the receiving chute than in Figure 2. Also, the shield 36 is clamped between the U-shaped member 37 and a block 38. The block or prop 39 retains the delivery chute rather than the receiving chute as in Figure 1. Instead of being bevelled below the gap 40, the connecting piece 41 has a convex surface 42.

In Figure 9 the receiving chute 50 has a concave channel 51 to receive cylindrical pieces 52. The forward end of the receiving chute, instead of being bevelled off, is preferably scooped or cut concavely as at 53. It has been found by experiment that different pieces are handled more satisfactorily with different details of construction such as those described herein.

The connecting piece 54 is formed integral with the receiving chute and has the delivery chute 55 secured therein. The bridge 56 of the connecting piece has merely a single bevel 57 below the gap 58.

Figure 11 shows a slightly different modification in which the receiving chute 60 has a semi-cylindrical concave channel 61 to carry short cylindrical pieces 62. The forward end of this member is bevelled off at 63, and the integral connecting piece 64 also has a single bevel 65 below the gap 66. In this case, as in those previously described, the intake end of the delivery chute 67 is flared at 68 to facilitate entrance of the properly alined pieces, as previously set forth.

What I claim is:

1. In a feeding device, a chute comprising a receiving portion and a delivery portion in substantially axial alinement and spaced apart to form a gap, a connecting member joining said portions in spaced relation, means for delivering articles to said receiving portion, said gap being of such size as to permit articles to fall therefrom, said connecting member having a portion lying below said chute and having a double bevel sloping downwardly away from the vertical axial plane of said chute.

2. In a feeding device, a chute comprising a receiving portion and a delivery portion in substantially axial alinement and spaced apart to form a gap, a connecting member joining said portions in spaced relation, means for delivering articles to said receiving portion, said gap being of such size as to permit articles to fall therefrom, said connecting member having a portion lying below said chute and sloping downwardly away from the vertical axial plane of said chute, the end of said delivery portion at said chute being enlarged to facilitate receiving articles from said receiving portion.

3. In a feeding device, a chute comprising a receiving portion and a delivery portion in substantially axial alinement and spaced apart to form a gap, a connecting member joining said portions in spaced relation, means for delivering articles to said receiving portion, said gap being of such size as to permit articles to fall therefrom, a portion of said delivery means being disposed directly below said gap, and a shield at the receiving end of said delivery portion to deflect articles into said delivery means.

ROY W. BAILEY.